US007463733B2

United States Patent
Watkinson

(10) Patent No.: US 7,463,733 B2
(45) Date of Patent: Dec. 9, 2008

(54) INTERFERENCE CANCELLATION EQUIPMENT

(75) Inventor: Peter Geoffrey Watkinson, Fulbourn (GB)

(73) Assignee: Broadcom Corporation, Irvine, CA (US)

( * ) Notice: Subject to any disclaimer, the term of this patent is extended or adjusted under 35 U.S.C. 154(b) by 947 days.

(21) Appl. No.: 10/149,123

(22) PCT Filed: Dec. 12, 2000

(86) PCT No.: PCT/GB00/04761

§ 371 (c)(1),
(2), (4) Date: Jun. 7, 2002

(87) PCT Pub. No.: WO01/43409

PCT Pub. Date: Jun. 14, 2001

(65) Prior Publication Data

US 2002/0191552 A1    Dec. 19, 2002

(30) Foreign Application Priority Data

Dec. 13, 1999  (GB) .................................. 9929442.3

(51) Int. Cl.
*H04M 1/76*       (2006.01)
(52) U.S. Cl. ..................................................... 379/416
(58) Field of Classification Search ......... 379/416–417; 370/201; 381/71.1–71.14
See application file for complete search history.

(56) References Cited

U.S. PATENT DOCUMENTS 4,112,370 A  *  9/1978  Monsen ....................... 370/201

| 5,208,786 | A |   | 5/1993 | Weinstein et al. ........... 368/124 |
| 5,740,256 | A | * | 4/1998 | Castello Da Costa et al. ..................... 381/94.7 |
| 5,887,032 | A |   | 3/1999 | Cioffi ......................... 375/257 |
| 5,901,230 | A | * | 5/1999 | Walker ........................ 381/66 |
| 6,192,256 | B1 | * | 2/2001 | Whinnett .................. 455/562.1 |
| 7,110,511 | B2 | * | 9/2006 | Goodman ................ 379/93.01 |

FOREIGN PATENT DOCUMENTS

| DE | 195 17 469 |   | 11/1996 |
| DE | 195 17 469 A1 | * | 11/1996 |
| EP | 0 987 830 |   | 3/2000 |

OTHER PUBLICATIONS

Patent Abstracts of Japan, vol. 018, No. 467, Aug. 30, 1994, & JP 06 152476 A, May 31, 1994, Abstract.

* cited by examiner

*Primary Examiner*—Ramnandan Singh
(74) *Attorney, Agent, or Firm*—Sterne, Kessler, Goldstein & Fox PLLC

(57) ABSTRACT

An interference cancellation method for use in a communications system in which a plurality of communication paths are arranged to transmit and receive respective analogue signals comprises effecting an initialization phase to calculate, for each path, the interference effects of the signals transmitted on that path on the signals received on each of the other paths, and storing for each a plurality of weighting factors representing the interference on each of the other paths respectively. During transmission, said weighting factors are used to generate from the transmitted signal on one of the said paths and to apply said cancellation signals to signals received on said other paths, thereby to cancel the interference effect of said transmitted signals.

14 Claims, 6 Drawing Sheets

INTERFERENCE CANCELLATION EQUIPMENT

This invention relates to interference cancellation equipment useful, for example, in cancelling interference in digital subscriber lines from central offices over twisted copper pair communication lines.

Digital subscriber line technology is a broadband data transmission technique capable of being implemented on existing and future telecommunications networks. Digital subscriber line technology can be implemented on telecommunications networks which rely on twisted copper wire pairs to carry signals between a central office and a number of end users and/or within the central office itself. In such telecommunications networks multiple insulated copper wire pairs are bundled together in a cable binder along portions of their route. Data generated digitally is converted into modulated analogue signals for transmission. Conversely, received analogue signals are converted into digital data.

One problem with such arrangements is that the signals transmitted through a given twisted pair in the form of modulated analogue waveforms interfere with signals in adjacent twisted pairs. This form of interference is called crosstalk and it causes problems because it makes it difficult to interpret the received analogue signals subject to crosstalk. That is, crosstalk from other twisted pairs causes problems in correctly demodulating and decoding the signal when it is received. Cross talk is most problematic when strong transmitted signals in adjacent twisted pairs are of comparable frequency to the weak received signal.

In existing systems, crosstalk poses limitations on the cable length, which affects received signal power due to attenuation.

Two different types of crosstalk degrade signal quality in twisted pair bundles. They are referred to as near end crosstalk (NEXT) and far end crosstalk (FEXT). Near end crosstalk is the most significant because the power of the transmitted signal is at its greatest, while the received signals have been attenuated during transit from the far end.

According to one aspect of the present invention there is provided an interference cancellation method for use in a communications system in which a plurality of communication paths are arranged to transmit and receive respective analogue signals, the communication paths being such that signals transmitted on one path interfere with signals received on another path, the method comprising: effecting an initialisation phase to calculate, for each path, the interference effects of the signals transmitted on that path on the signals received on each of the other paths, and storing for each path a plurality of weighting factors representing the interference on each of the other paths respectively; and during transmission, using said weighting factors to generate from the transmitted signal on one of said paths, a cancellation signal for each of the other paths and applying said cancellation signal to signals received on said other paths thereby to cancel the interference effect of said transmitted signal.

According to another aspect of the present invention there is provided interference cancellation equipment for use in a communications system in which a plurality of communication paths are arranged to transmit and receive respective analogue signals, the communication paths being such signals transmitted on one path interfere with signals received on another path, the circuitry comprising: a transmitted data store for holding, for any of the paths, respective sequences of digital data transmitted on those paths; a processor for monitoring received digital data in an initialise phase of operation to calculate, for each path, the interference effects of the signals transmitted on that path on the signals received on each of the other paths and for generating weighting factors; and a weighting factor store for holding for each path a plurality of weighting factors representing the interference on each of the other paths, respectively, wherein the processor is operable during transmission to use said weighting factors to generate from the transmitted signal on one of said paths, a cancellation signal for each of the other paths and to apply said cancellation signal to signals received on said other paths thereby to cancel the interference effect of said transmitted signal.

According to another aspect of the present invention there is provided a method of setting up a crosstalk information table in a communications system comprising a plurality of communication paths, the method comprising, for a first of said paths, transmitting a predetermined signal only on said path and detecting the received signal on each of the other paths in the absence of any other transmission correlating the received signal on each path with the transmitted signal on the first path and calculating a crosstalk weighting factor by determining the ratio of the received signal power with the transmitted power at a certain delay, storing the crosstalk weighting factor each other path against the first path in the crosstalk information table, and repeating the steps for each of the second and subsequent paths.

The invention also provides a communication system comprising a plurality of twisted wire pairs each arranged to transmit and receive respective analogue signals and being arranged in a common cable housing and an interference cancellation circuit which comprises: a transmitted data store for holding, for any of said twisted pairs, respective sequences of digital data transmitted on that pair; a processor for monitoring received digital data in an initialise phase of operation to calculate for each pair the interference effects of the signals transmitted on that pair on the signals received on each of the other pairs and for generating weighting factors; and a weighting factor store for holding for each pair a plurality of weighting factors representing the interference on each of the other pairs respectively; wherein the processor is operable during transmission to use said weighting factors to generate from the transmitted signal on one of said pairs a cancellation signal for each of the other pairs.

The invention is particularly useful in cancellation of crosstalk where frequencies overlap on the transmit and receive sides. For example, for a downstream frequency range of 26 kHz to 1104 kHz and an upstream frequency range of 26 kHz to 138 kHz, there is an overlap frequency band where crosstalk may be a problem, that is 26 kHz to 138 kHz. The present invention can be used to effect in reducing the crosstalk in such a frequency range, in particular at the higher end. Of course, it can also be used outside that frequency range to improve signal quality.

A specific embodiment of the present invention will now be described, by way of example only, with reference to the accompanying drawings in which.

Figure 5:
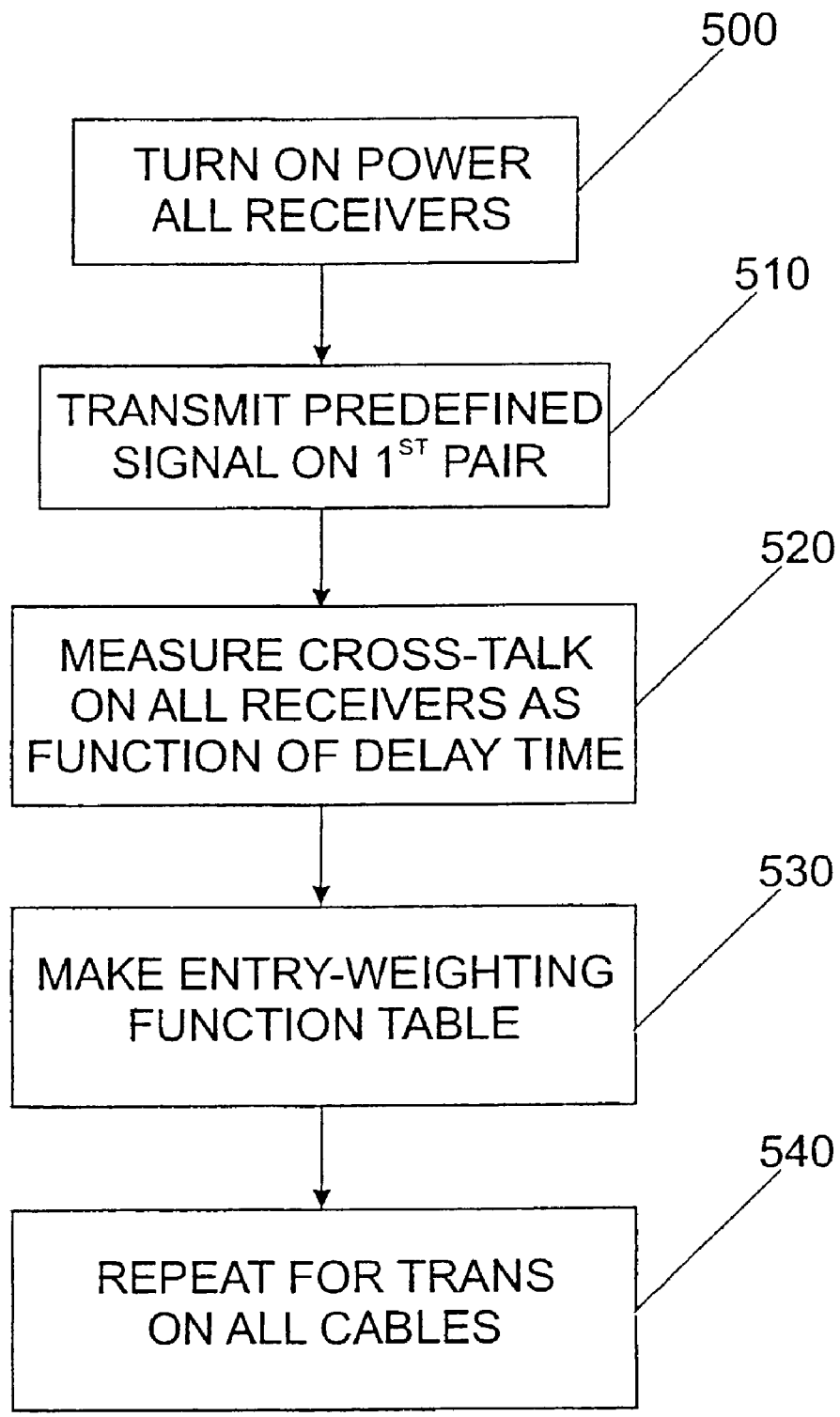
Figure 6:
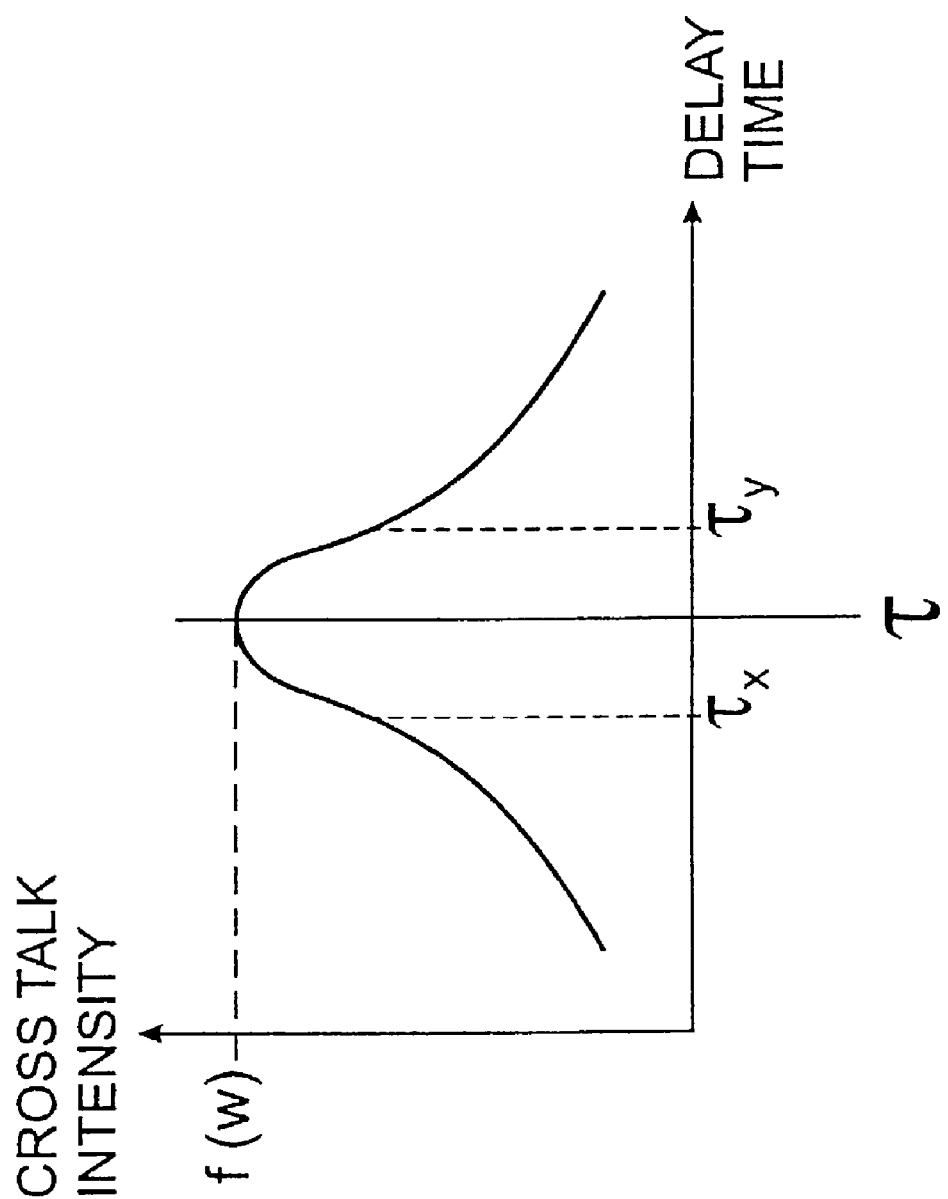

FIG. 5 outlines schematically a procedure for initialisation of communications equipment; and FIG. 6 is an example of a correlation plot.

The phrase "downstream" used herein refers to the direction of communication from the central office network to the end user and the phrase "upstream" refers to the reverse direction.

Figure 1:
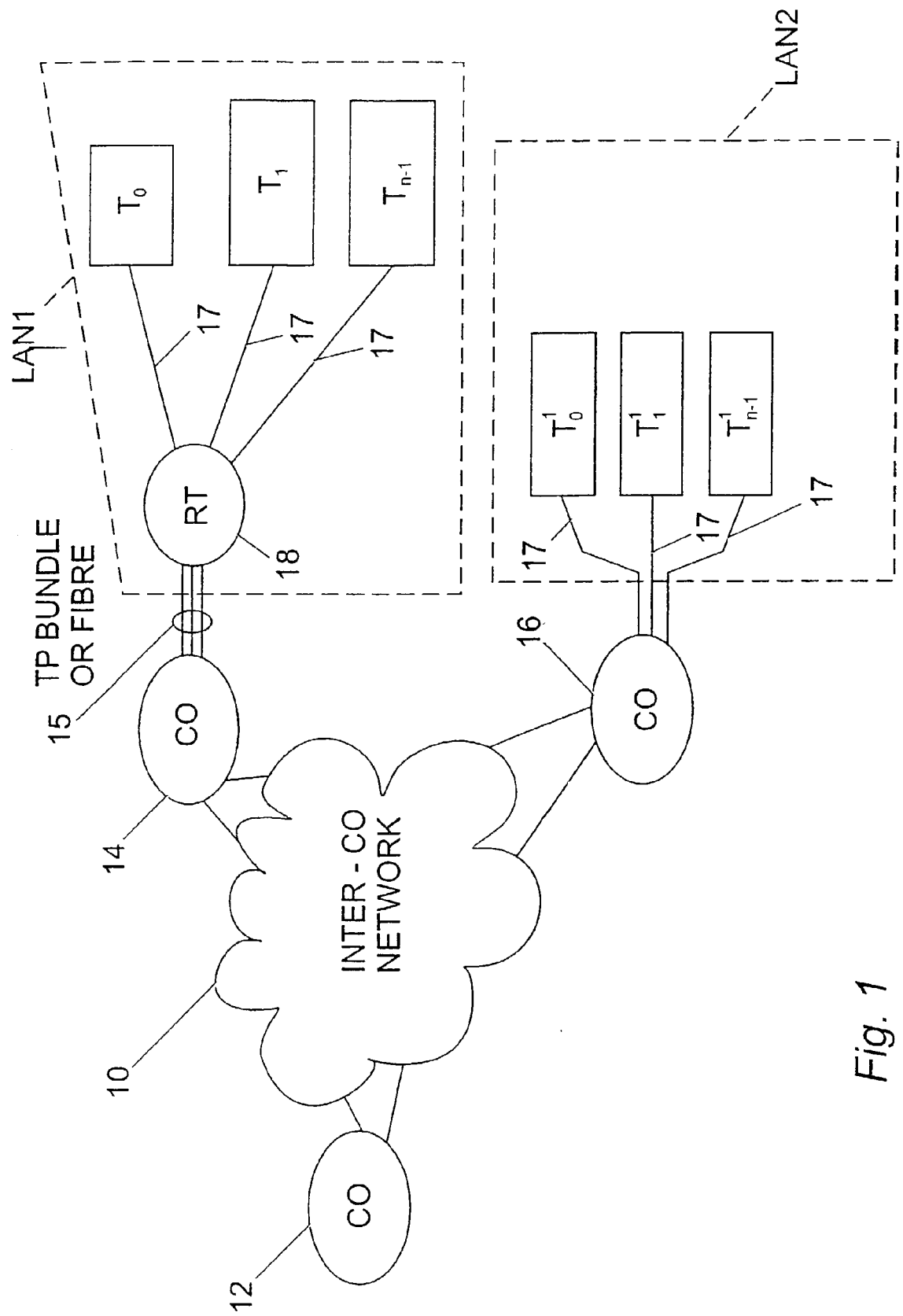
FIG. 1 is a schematic illustration of a telecommunications network in which digital subscriber lines can be implemented.

Referring to FIG. 1, a telecommunications network comprises an inter-central office network 10 connecting several central offices 12, 14, 16 by means of optical fibres. A first local access network LAN1 is shown branching from a remote terminal 18 connected to the central office 14 to a plurality of end user terminals $T_0$, $T_1$, $T_{n-1}$. The remote terminal 18 is located separately from the central office 14 to which it is connected. Remote terminals are intermediate distribution points located geographically closer to the end user's premises in order to improve service reliability. The communication line from the central office 14 to the remote terminal 18 consists of a bundle 15 of twisted pairs. The communication lines 17 from the remote terminal 18 to the end user terminals $T_0, T_1, \ldots T_{n-1}$ consist of individually routed twisted pairs. Each twisted pair comprises two copper wires which are twisted together and from which a voltage differential is driven to convey analogue signal information down the pairs.

A second local access network LAN2 shown branching from another of the central offices 16 serves another group of end user terminals $T'_0, T'_1 \ldots T'^{51}{}_{n-1}$. In the second local access network, the respective end user terminals are connected directly to the central office by individual twisted pair communications 17.

Within the central office there is provided central office equipment necessary to provide end users with the digital network services to which they subscribe. Within the central office, data is conveyed digitally and is subject to digital signal processing, switching etc. For communications outside the central office, digital data is fed to and from a plurality of line cards via a high speed bi-directional digital feed on the network side of the line card. Each line card connects to a plurality of twisted pairs on the end user side.

The twisted pairs running from the line card are physically bundled together to form a single larger cable 15 running towards the end users. Inside the bundle the twisted pairs are arranged adjacent one another until the larger cable reaches a point where they may be conveniently separated and routed to geographically distinct locations of the individual end users. In North America, twisted pair bundles conventionally contain 24 separate twisted pair lines. Twisted pair bundles in Europe and elsewhere typically contain 32 individual twisted pair lines. Bundles containing different numbers of twisted pair lines are possible.

Figure 2:
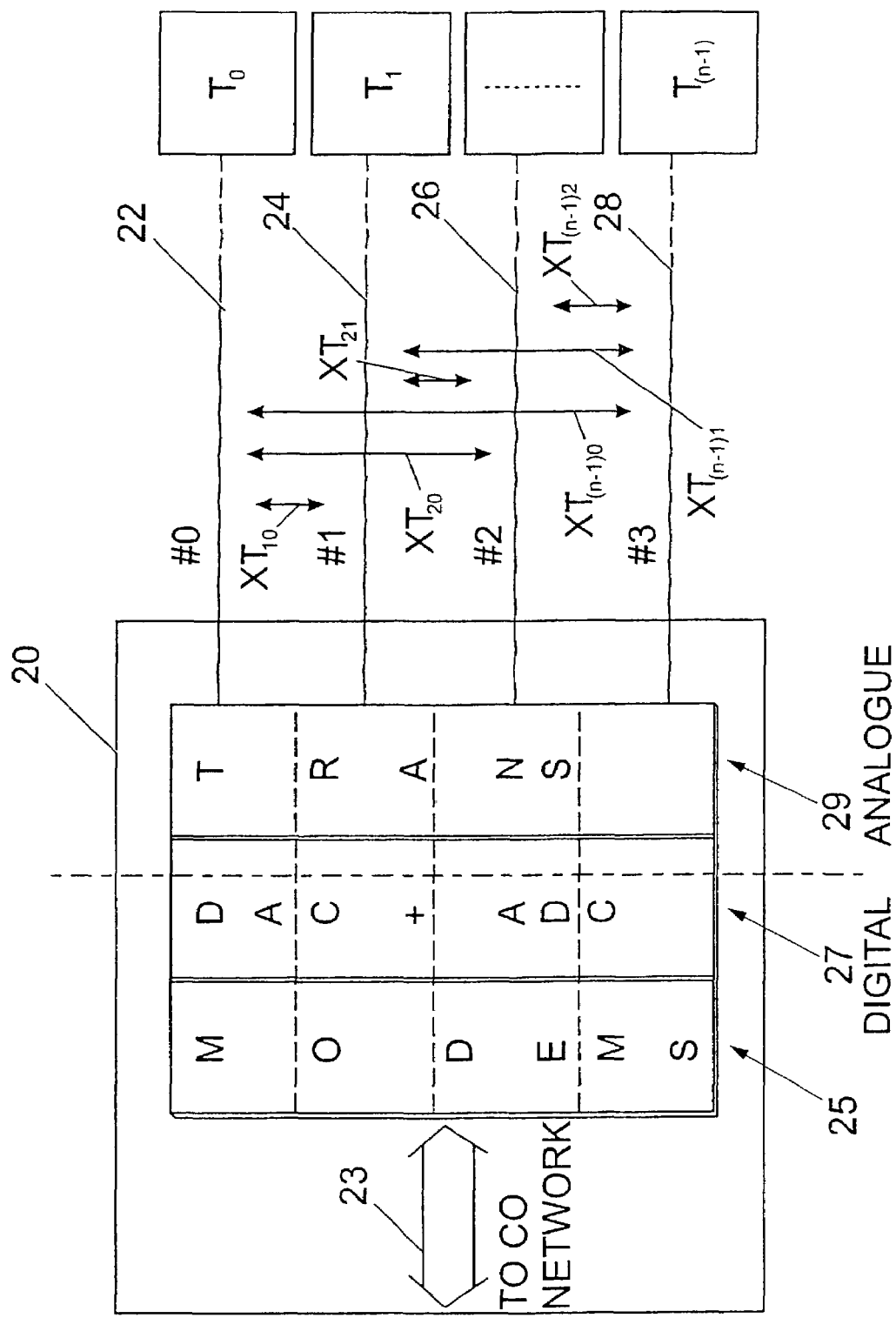
FIG. 2 is a schematic illustration of multiple twisted pair communication paths between a central office location and a plurality of respective users.

FIG. 2 shows a line card 20 located in a central office environment. The line card 20 carries modem circuitry 25 which is connected to a bi-directional digital data bus 23 in the central office. The modem circuitry 25 is connected to an analogue front end (AFE) which includes digital to analogue conversion circuitry 27 as well as transceiver circuitry 29. The transceiver circuitry includes output line drivers and incoming receivers which are connected to a plurality of twisted pairs 22, 24, 26, 28 serving remotely located end users $T_0$, $T_1, \ldots T_{n-1}$. Although not all are shown, there are a total of n twisted pairs, each representing a bi-directional analogue communication channel #0,#1,#2 . . . #(n-1). As mentioned above, in existing systems n equals 24 or 32 but n can equal any suitable number.

The modem circuitry 25 on the line card 20 carries digital data between the central office network and the analogue front end The AFE converts between the analogue and digital domains. In the analogue domain inductive and/or capacitive couplings between twisted pairs cause crosstalk. These couplings are indicated on FIG. 2 by means of the arrows designated $XT_{10}$, $XT_{20}$, $XT_{(n-1)0}$, $XT_{21}$, $XT_{(n-1)1}$. A much higher number of couplings would exist if all of the twisted pair communication lines were shown on the drawing.

The notation $XT_{10}$ means the crosstalk between pairs #0, #1. That is, a signal transmitted on pair #0 will induce a signal $XT_{10}$ in pair #1.

Figure 3:
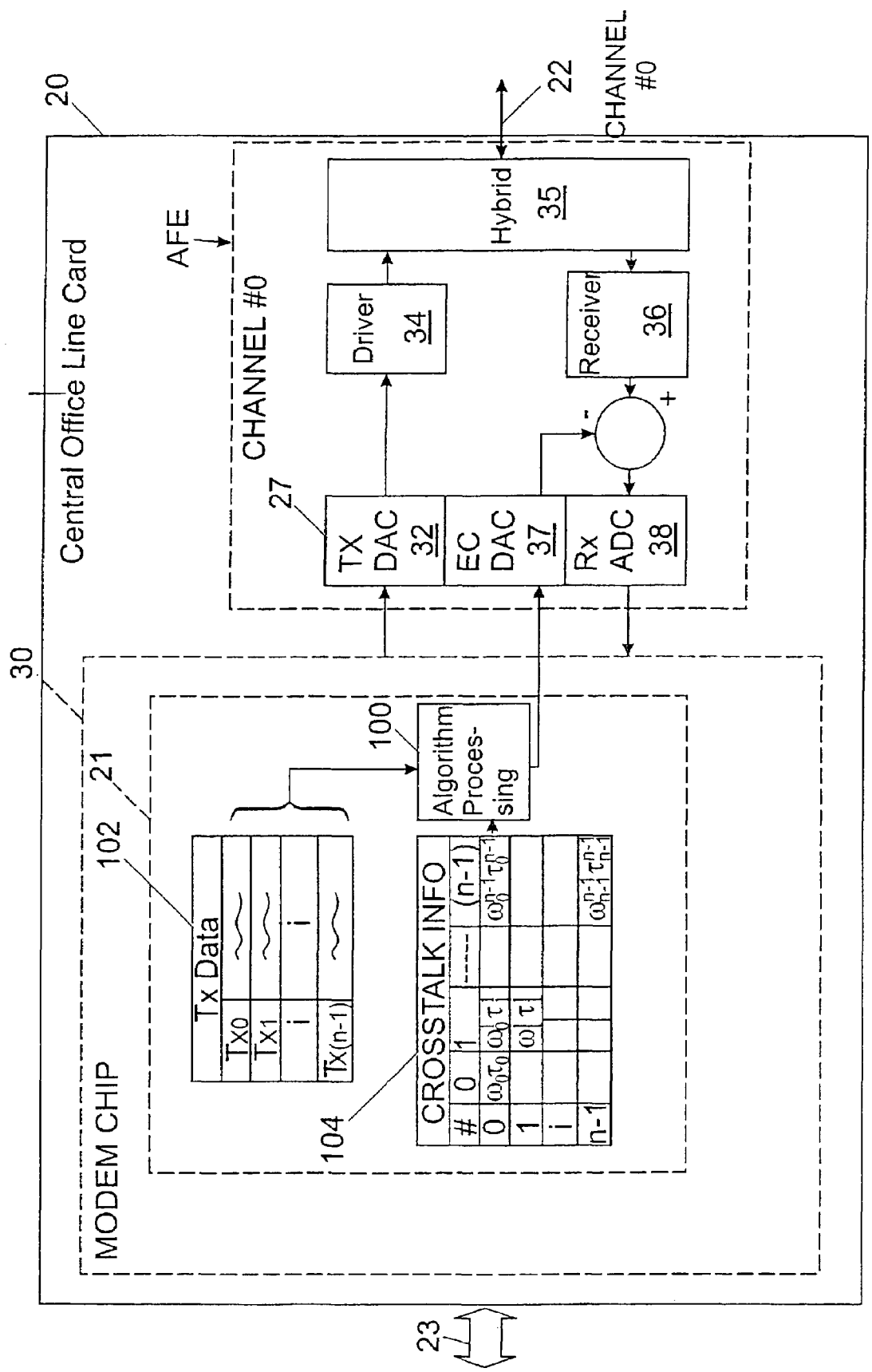
FIG. 3 is a schematic illustration of preferred communications equipment for connecting to twisted pairs.

FIG. 3 shows further particulars of a line card 20 and interference cancellation circuitry 21 which may be implemented to reduce the effects of crosstalk. For the sake of clarity, FIG. 3 shows a modem chip 30 together with the AFE circuitry associated with only one twisted pair 22 (channel #0). Each channel has its own associated AFE circuitry, but several channels may be driven from a common modem chip. Each twisted pair is associated with modem logic provided in a modem chip. The modem logic for each channel implements a transmit and a receive path. The modem chip 30 is connected to receive digital signals from the bus 23 in the downstream direction and supplies modulated digital samples to a digital to analogue conversion circuit 32 for converting the digital samples into analogue signals for transmission over the twisted pair. A driver circuit 34 drives appropriate voltage differentials on to the twisted pair 22. Generation of the modulated digital samples from the digital data on bus 23 is discussed later.

Each receive path leading from a given twisted pair in the upstream direction includes a receiver interface 36, and an analogue to digital conversion circuit 38 for converting analogue waveforms received from the users into digital samples. The driver 34 and receiver 36 are connected via a hybrid interface 35 to the twisted pair 22. The hybrid interface 35 combines/splits the downstream analogue signal from the driver 34 and the upstream analogue signal to the receiver 36 from the transmit pair 22. The digital to analogue converter 32, driver circuit 34, receiver 36 and analogue to digital converter 38 are replicated as necessary to serve the total number of twisted pair communication channels #0,#1,#2 . . . #(n-1), the modem chip 30 being capable of processing communications on all of the twisted pair channels 20 simultaneously. The ADC 38 includes a sampler for supplying digital samples at a predetermined rate.

The bus 23 could be a backplane or implemented as two unidirectional buses.

The interference cancellation circuitry 21 includes a controller 100, a transmit history table 102 and a crosstalk information table 104.

In the downstream direction, the modem chip 30 processes digital data received from the inter-central office network and modulates it to create a digital sampled representation of the analogue signal. This sample data is fed to the digital to analogue converter 32, the output of which is supplied to the driver circuitry 34 to drive a voltage differential onto the twisted pair 22.

In the upstream direction, an analogue signal is received via the hybrid interface 35 at the receiver, from where it is supplied to the analogue to digital converter/sampler 38 for conversion from analogue waveforms into a stream of digital signal samples which are supplied for demodulation by the modem chip 30 and further processing by additional network components on the upstream side of the line card.

Demodulation reliability is improved by removing an "echo" of the transmitted signals from received signals. The echo tends to be formed in the analogue front end and mixes in with the received signal coming upstream. This alters the shape of the received waveform. Without suitable processing, this reflection of the downstream analogue signal would interfere with the received signal and so cause problems in correctly demodulating the latter.

The preferred method of removing the echo is by creating a second output signal, referred to herein as the echo cancellation (EC) signal. The echo cancellation signal is intended to model closely the echo which would normally be received as a reflection of the downstream transmitted signal. The echo cancellation signal once created is output through a second digital to analogue converter and then electrically subtracted from the raw upstream signal before it is received. Since the raw upstream signal will contain both the far end user transmission, and the near end echo from the downstream transmission, the echo cancellation signal cancels the echo. This leaves just the intended end user transmission signal to be processed.

The present invention is not focused on the echo cancellations, but is primarily concerned with removing crosstalk interference from other twisted pairs.

The transmit history table 102 is a record of signals transmitted downstream from the central office equipment along each of the twisted pair channels #0 to #(n−1). The transmit history table 102 is thus an on chip memory space for recording values representing the signal sample most recently transmitted on a given communication channel. In most applications it is sufficient to store the last 20 to 50 digital samples transmitted. Each stored data sample 110 is associated with a label $T_{x0}, T_{x1}, \ldots T_{Xn-1}$ indicating which of the communication channels #0,#1,#2 … #(n−1) the stored transmission data relates to. The data is stored as multibit digital samples, with each sample being stored as 16 bits in one example. It is not necessary to store 16 bits; any suitable number of bits could be used to represent each sample depending on the quality of the system.

The crosstalk information table 104 is another on chip memory space which stores for each communication channel #0 to #(n−1) information on the relative magnitudes of the crosstalk signal levels induced between a given twisted pair and each of the remaining pairs of the twisted pair bundle. The crosstalk information table 104 is in effect a matrix with the various rows and columns containing weighting coefficients and delay information indicating respectively the relative magnitudes of the electromagnetic coupling between adjacent twisted pairs in the bundle and the delay time which is a timing factor.

Referring to the top row of the crosstalk information table 104 channel numbers #0 to #(n−1) corresponding to each of the n twisted pairs of the bundle are listed horizontally. The left hand column of the crosstalk information table 104 also lists the channel numbers corresponding to each of the twisted pairs of the bundle. Stored values within the crosstalk information table 104 include for each pair of interacting channels a weighting coefficient and a delay function. Thus, the values stored in respect of the coupling between channel #0 and channel #1 are $\omega_0^1$ and $\tau_0^1$, whereas the values stored in respect of, for example, channel #2 and channel #n are $\omega_2''$ and $\tau_2''$.

The controller 100 controls operation of the chip. The following describes only its actions relating to interference cancellation. The controller 100 operates in an initialisation phase to set up the crosstalk information table 104. Then in, operation, the controller 100 uses information from the transmit data table 102 and the crosstalk information table 104 to compute the cumulative effects of near end crosstalk on the signals being received. The crosstalk between adjacent twisted pairs is then taken into account by subtracting a deliberately generated crosstalk cancellation signal from the received signal at an appropriate point in time.

Figure 4:
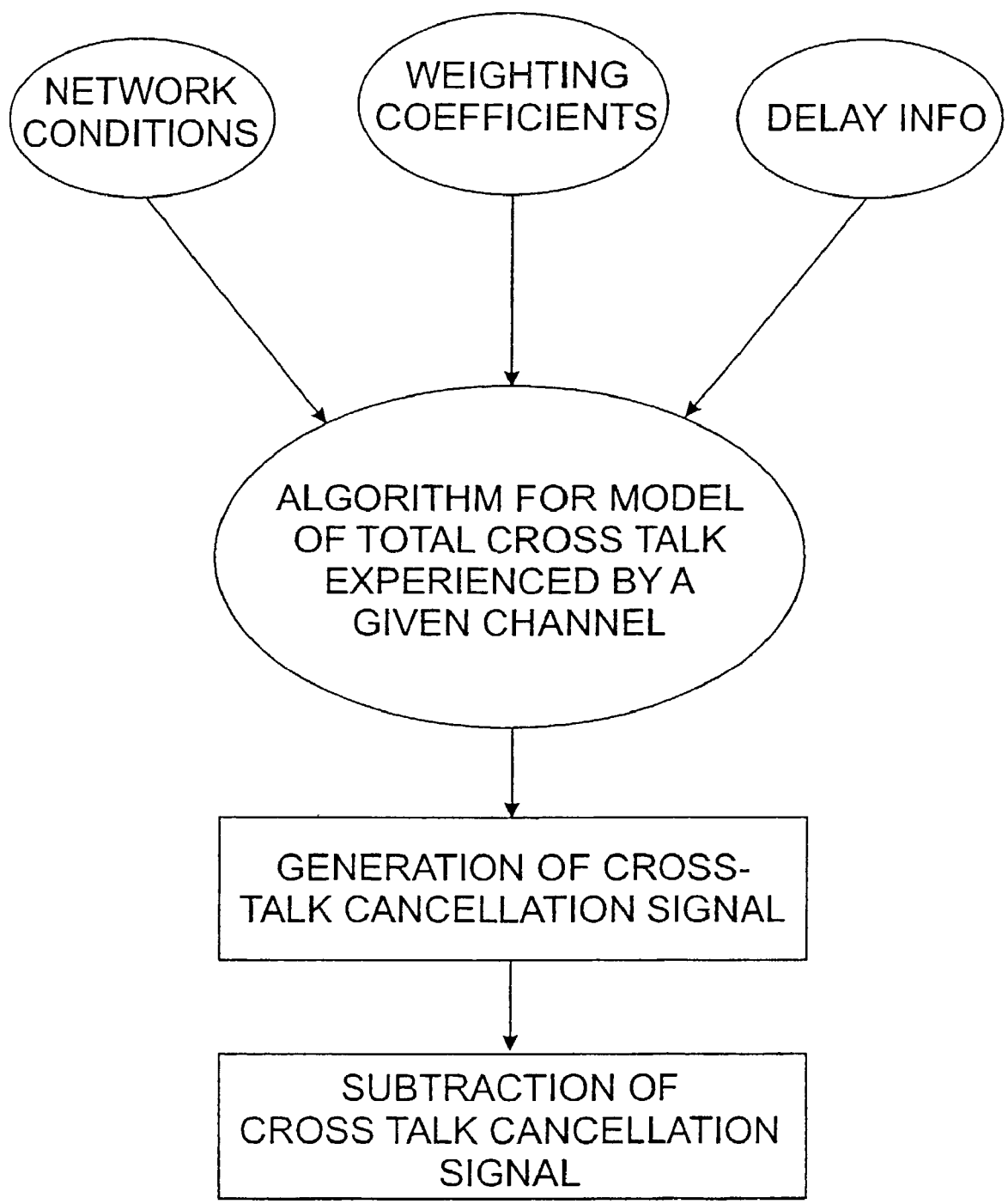
FIG. 4 shows schematically how the effects of crosstalk can be computed.

Normal operation will firstly be described with reference to FIG. 4. The controller 100 processes a received signal on channel #x with crosstalk information including the weight coefficient and delay time for that channel. It examines the transmit data for each of the other channels and generates a crosstalk cancellation signal based on the transmit data, the weighting factor and delay time.

An algorithm for generation of the crosstalk cancellation signal could be implemented in a similar fashion to that which is used to produce the echo cancelling signal. The echo cancelling signal for channel #n may be produced as the following sum (inverted):

$$T_{xn(t)}*e_{n(t)}+T_{xn(t-1)}*e_{n(t-1)}+\ldots T_{xn(t-p)}*e_{n(t-p)}$$

Where p is the number of signal samples used in echo cancellation. P may be for example 20-50 values for echo cancellation, where $T_{xn(t)}$ is the transmit value for channel #n at time t and $e_{n(t)}$ is the echo coefficient for channel n at time t. For crosstalk cancellation, fewer samples will normally suffice. In the following example one sample is used, although in practice 2 to 10 samples (or any suitable number) may be used.

This mechanism can be extended to the production of a crosstalk cancellation signal. The above sum is repeated, but the transmitted value is that for an adjacent channel and the coefficient is for the crosstalk from that channel. In that sum, there are coefficients for a number of points in time for each channel.

In a simplified method, there is one coefficient (w) for use with the transmitted sample delayed at time $\tau$. That is the crosstalk cancellation signal is the sum of {[crosstalk weight coefficient (w)* transmitted sample from crosstalk channel delayed by ($\tau$)] for each crosstalk pair}, i.e.:

$$\Sigma_{\#o}=(w^1_o*T_{x1}(\tau_o^1))+(w_o^2*T_{X2}*T_{X2}(\tau_o^2))+\ldots (w_o^{n-1}*T_{x(n-1)}(\tau_o^{n-1}))$$

Where $w_o^2$ is the crosstalk weighting coefficient from channel #n to channel #0 and $T_{xn}$ is the transmitted sample $\tau_o''$ clock cycles previously. Whether using the simplified or more complex formulae, the sum is repeated for each output channel using the transmitted value from that channel and the crosstalk coefficients from that channel to the received channel.

The sum is repeated for each output channel using the transmitted value from that channel and the crosstalk coefficients from that channel to the received channel.

The sum of all of these represents the value that should be put out for that sample to the second digital to analogue converter 37, because this represents the combined cancellation signal for the echo and crosstalk.

As described above, in the preferred embodiment, removing the crosstalk signal contribution from the received signal is achieved by combining the crosstalk cancellation signal with the echo cancellation signal which is already generated as a second output signal. Once created the combined crosstalk and echo cancellation signal is output through the second digital to analogue converter, and then electrically subtracted from the raw upstream signal coming from the end user. The cancellation signal cancels the signal perturbations caused by the combined effects of crosstalk and echoes. This leaves an a high quality customer transmission signal to be processed via the analogue to digital converter 38, sampler 39 and modem 30.

The values stored in the crosstalk information table 104 on which computation of the crosstalk cancellation signal relies can be determined and stored for predetermined periods of time. Provided the cable bundles/network layout are not rearranged the relative proximity of the twisted pairs inside them ought not to change appreciably and the crosstalk information values do not need to be refreshed. Preferred embodiments determine the values to be stored in the crosstalk information table in an initialisation process each time the central office equipment is powered up as will be explained below with reference to FIGS. 5 and 6.

FIG. 5 shows steps of an initialisation process which may be performed by central office equipment in order to determine the values to be stored in the crosstalk information table 104. Referring to the step designated 500, the plurality of receiver circuits 36 on the line card 20 are switched on when the card is initially powered up. The modem 25 then performs a predefined sequence of transmissions over each of the various channels #0 to #n−1 in turn (see step 510). In the absence of any far end transmission activity, the driver circuit 34 of the first channel #0 transmits a known signal sample. In step 520, receivers on every other channel record the reflected crosstalk signal at the line card. These receivers correspond to the receiver 36 of the first channel #0. For each of the other channels, the received signal is correlated with the signal transmitted on channel #0 to produce a correlation curve as shown in FIG. 6. The weighting coefficient ω for each channel #x indicating the relative sizes of the coupling are derived from the results by taking the ratio of the received signal power on channel #x to the transmitted power or channel #0 at the correlation peak at delay τ. That delay τ is also stored.

Referring back to FIG. 5, the step 530 records the weighting coefficients ω and the associated delay time τ in the crosstalk information table for use later during normal operation of the central office equipment. Steps 500 to 530 are repeated by performing transmissions on each of the remaining channels #2 to #n in turn.

In this way the undesirable effects of crosstalk occurring in the wiring bundles of central office systems, and also elsewhere within the central office system, can be eliminated or reduced. Preferred embodiments have particular advantages where a single chip processes multiple digital subscriber lines together because information from each channel is shared with all other channels on chip very effectively.

It would be possible to hold a number of weighting factors at different delays for each channel to "finetune" the cancellation at different parts of the line.

Preferred embodiments afford particular advantages when as described above with modems implemented as logical channels within one chip capable of processing multiple communication channels. It is also possible however for modems to be implemented as individual chips or as a multi-chip set capable of processing multiple communication channels.

In one modification, the crosstalk cancellation signal remains in the digital domain and is digitally subtracted from the received signal after it has passed through the analogue to digital conversion circuitry.

In another modification, transmit data information corresponding to that stored in the transmit data table is retained temporarily in buffers associated with the respective line driver circuits 34. In such an embodiment it would be useful to buffer up approximately 20 to 50 recently transmitted data samples.

In another modification, the delay time information usually stored in the crosstalk information table is neglected and so does not need to be stored. Instead, an "average" delay is used for all channels. While this compromises performance it simplifies the crosstalk algorithm. That is the same delay sample ($T_{xn}$) is used for all channels.

In another embodiment, an impulse response is computed from the received sample data and is subsequently stored as a function in the crosstalk information table with an indication of the range of delay values to which it corresponds.

Methods implemented in the downstream can be applied in the upstream direction, for example by determining crosstalk at user terminals and applying a cancellation signal at the end user's modem, in particular where the user terminal has a multi-channel modem and cancellation is between the channels of this modem.

Signal transmission over digital subscriber lines can employ many different modulation techniques and it will be apparent that preferred embodiments can be applied irrespective of the particular modulation technique being used.

Implementations are not limited to any of the arrangements or configurations described herein. Specifically, the described embodiment merely represents an example of a configuration which may be used to implement the preferred method.

The invention claimed is:

1. An interference cancellation method for use in a fixed communications system in which a plurality of communication paths are arranged to transmit and receive respective analogue signals, the communication paths being such that signals transmitted on one path interfere with signals received on another path, the method comprising:

effecting an initialization phase, during which test signals are transmitted, to calculate, for each path, interference effects of the signals transmitted on that path on the signals received on each of the other paths, and storing for each path a plurality of weighting factors ($\omega_0$–$\omega_{n-1}$) representing the interference on each of the other paths respectively, wherein in the initialization phase a timing value ($\tau_0$–$\tau_{n-1}$) is stored with each weighting factor representing the effective relative delay of the interference signal on each path; and during transmission of communication signals, using said weighting factors and respective timing values to generate from the transmitted signal on one of said paths, a cancellation signal for each of the other paths and applying said cancellation signal to signals received on said other paths thereby to cancel the interference effect of said transmitted signal.

2. An interference cancellation method according to claim 1 wherein the communication paths are arranged as twisted wire pairs.

3. An interference cancellation method according to claim 1 wherein in the initialization phase, the signal transmitted on said one path is correlated with the signals received on each of the other paths, respectively and wherein the weighting factor ($\omega_0$–$\omega_{n-1}$) for each of the other paths is derived from the ratio of the transmission power of the received signals on each path to the power of the signal transmitted on that path at the correlation peak.

4. An interference cancellation method according to claim 1 wherein, for each path, a set of weighting factors ($\omega_0$–$\omega_{n-1}$) with associated respective delays ($\tau_0$–$\tau_{n-1}$) is stored representing interference on each of the other paths.

5. An interference cancellation method according to claim 1 wherein said cancellation signal is applied in the digital domain.

6. An interference cancellation method according to claim 1 wherein the cancellation signal is applied in the analogue domain.

7. An interference cancellation method according to claim 1 wherein transmit signal data is stored for use in generating a crosstalk cancellation signal during transmission.

8. An interference cancellation method according to claim 1 wherein during transmission the cancellation signal is generated by using transmitted signals at the effective relative delay for that path.

9. Interference cancellation equipment for use in communications system in which a plurality of communication paths are arranged to transmit and receive respective analogue signals, the communications paths being such that signals transmitted on one path interfere with signals received on another path, the circuitry comprising:
- a transmitted data store for holding, for any of the paths, respective sequences of digital data transmitted on those paths;
- a processor for monitoring received digital data in an initialize phase of operation to calculate, for each path, the interference effects of the signals transmitted on that path on the signals received on each of the other paths and for generating weighting factors ($\omega_0 - \omega_{n-1}$) to be stored with respective time values ($\tau_0 - \tau_{n-1}$), the timing values representing the effective relative delay of the interference signal on each path; and
- storage to hold for each path a plurality of weighting factors representing the interference on each of the other paths, respectively, and said respective timing values, such weighting factors being determined during an initialization of the equipment,
- wherein the processor is adapted such that during transmission said weighting factors and said respective timing values are used to generate from the transmitted signal on one of said paths, a cancellation signal for each of the other paths and to apply said cancellation signals to signals received on said other paths thereby to cancel the interference effect of said transmitted signal.

10. Interference cancellation equipment according to claim 9 which comprises digital to analogue conversion circuitry for converting digital data to be transmitted into analogue signals.

11. Interference cancellation equipment according to claim 9 which comprises analogue to digital conversion circuitry for converting received analogue signals into digital data.

12. Interference cancellation equipment according to claim 9 which comprises modem circuitry connected as an interface to transmit and receive digital data.

13. A communications system comprising a plurality of twisted wire pairs each arranged to transmit and receive respective analogue signals and being arranged in a common cable housing and an interference cancellation circuit which comprises:
- a transmitted data store for holding, for any of said twisted pairs, respective sequences of digital data transmitted on that pair;
- a processor for monitoring received digital data in an initialize phase of operation to calculate for each pair the interference effects of the signals transmitted on that pair on the signals received on each of the other pairs and to generate weighting factors ($\omega_0 - \omega_{n-1}$) to be stored with respective timing values ($\tau_0 - \tau_{n-1}$), the timing values representing the effective relative delay of the interference signal on each path; and
- storage for holding for each pair a plurality of weighting factors representing the interference on each of the other pairs respectively, and respective timing values, such weighting factors being determined during an initialization of the equipment;
- wherein the processor is adapted such that during transmission said weighting factors and said respective timing values are used to generate from the transmitted signal on one of said pairs a cancellation signal for each of the other pairs.

14. A method of setting up a crosstalk information table and utilizing it during subsequent normal communication carried out by a communications system comprising a plurality of communication paths, the method comprising:
- for a first of said paths, transmitting, during an initial phase of operation of a fixed communication arrangement, a predetermined signal only on said path and detecting the received signal on each of the other paths in the absence of any other transmission correlating the received signal on each path with the transmitted signal on the first path and calculating a crosstalk weighting factor ($\omega_0 - \omega_{n-1}$) by determining the ratio of the received signal power with the transmitted power at a certain delay ($\tau_0 - \tau_{n-1}$), storing the crosstalk weighting factor for each other path against the first path in the crosstalk information table, and repeating the steps for each of the second and subsequent paths; and
- after the crosstalk information table has been populated with data, applying the values of such data to create cancellation signals used to reduce crosstalk during normal communication.

* * * * *